C. G. TROSIEN.
GEAR LOCK FOR AUTOMOBILES.
APPLICATION FILED FEB. 11, 1918.
1,280,589.
Patented Oct. 1, 1918.
2 SHEETS—SHEET 1.
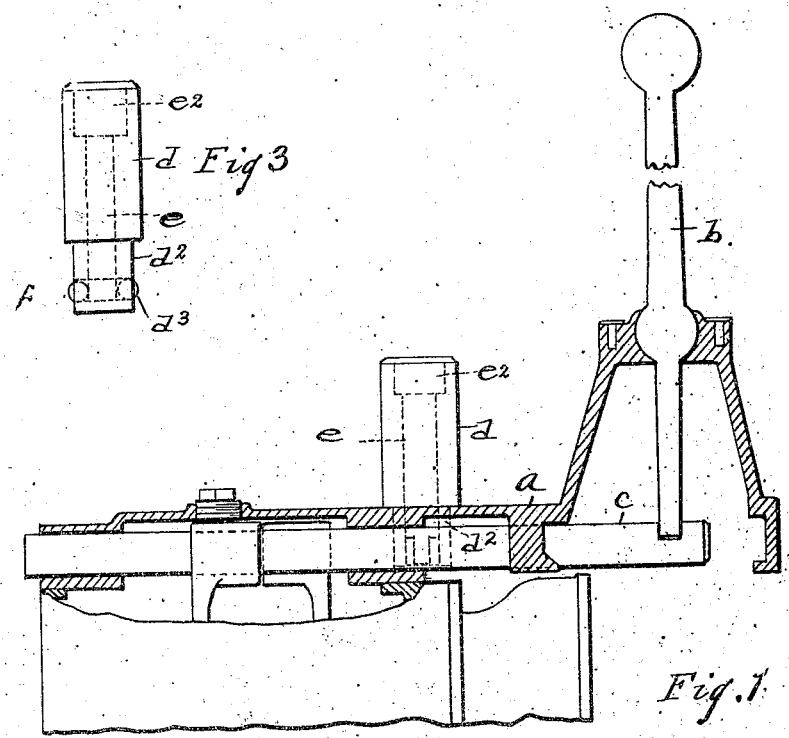
Fig. 3
Fig. 1
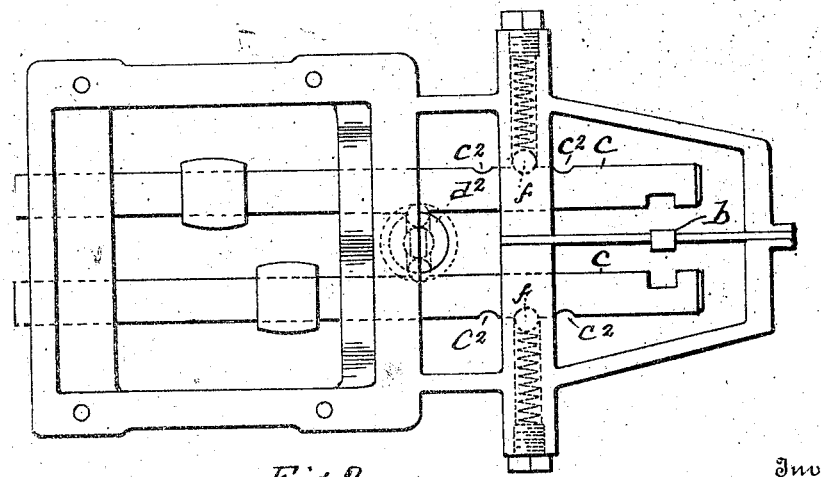
Fig. 2
Inventor
CHARLES G. TROSIEN.
By Ralzemond A. Parker
Attorney

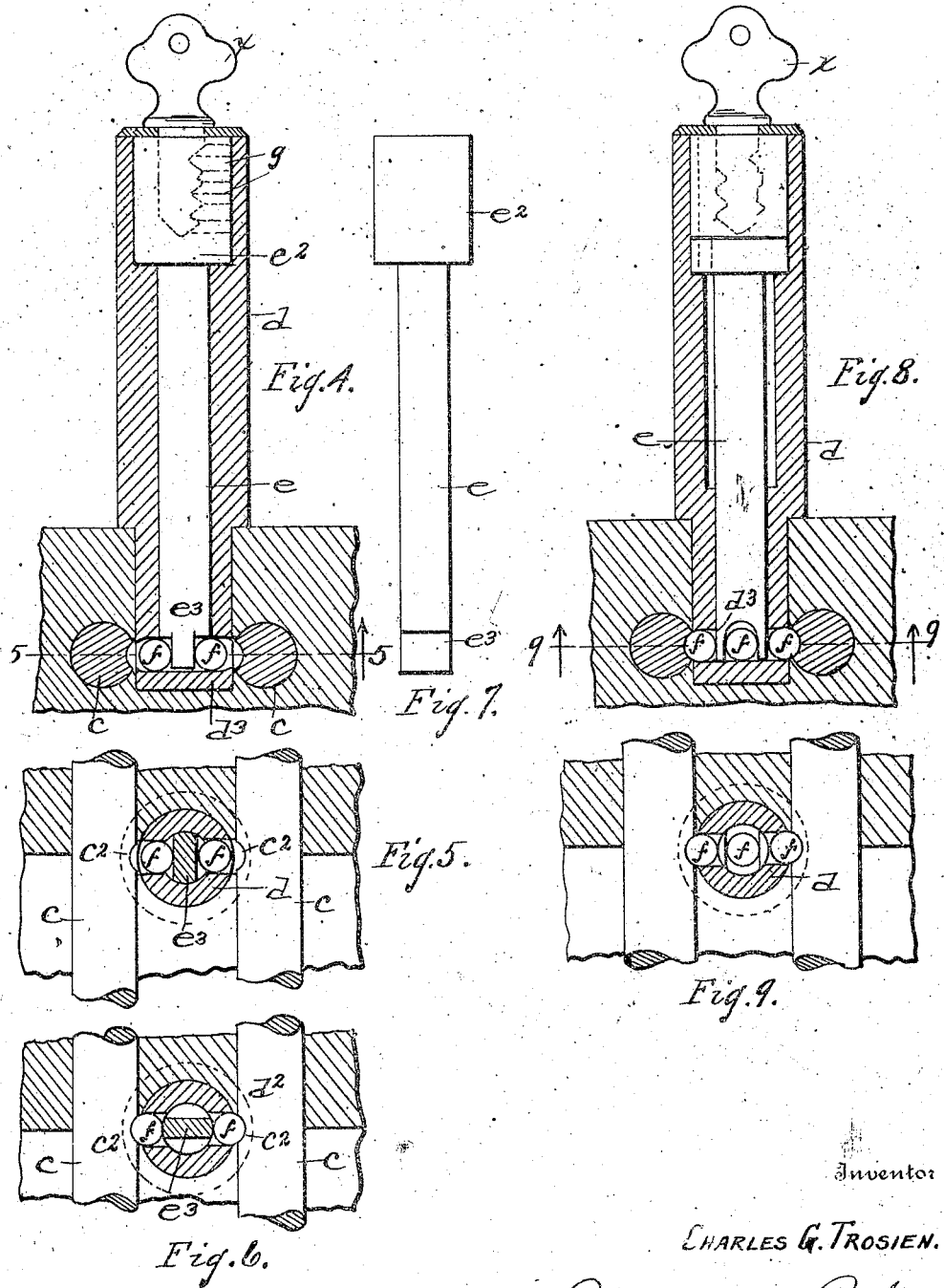

UNITED STATES PATENT OFFICE.

CHARLES G. TROSIEN, OF PONTIAC, MICHIGAN.

GEAR-LOCK FOR AUTOMOBILES.

1,280,589.

Specification of Letters Patent.

Patented Oct. 1, 1918.

Application filed February 11, 1918. Serial No. 216,498.

*To all whom it may concern:*

Be it known that I, CHARLES G. TROSIEN, a citizen of the United States, residing at Pontiac, county of Oakland, State of Michigan, have invented a certain new and useful Improvement in Gear-Locks for Automobiles, and declare the following to be a full, clear and exact description of the same, such as will enable others skilled in the art to which it pertains to make and use the same, reference being had to the accompanying drawings, which form a part of this specification.

My invention relates to gear locks for automobiles and a special object of my improvements is to provide a lock which is simple in construction, complete in itself, and may be readily applied to automobiles in general use.

I secure this object in the device illustrated in the accompanying drawings in which:

Figure 1 is a part sectional elevation of a gear casing with a lock embodying my invention applied thereto.

Fig. 2 is an inverted plan view of the same.

Fig. 3 is an elevation of the lock separate from the gear casing.

Fig. 4 is a sectional view of the lock and a portion of the gear casing adjacent thereto.

Fig. 5 is a section on the line 5—5 Fig. 4.

Fig. 6 is a view similar to Fig. 5 showing the parts in locking position.

Fig. 7 is an elevation of the rotating spindle detached from its casing.

Fig. 8 is a view similar to Fig. 4 showing a modified construction.

Fig. 9 is a section on the line 9—9 Fig. 8.

$a$ is the casing for the change speed gear. $b$ is the shifting lever and $c\ c$ are the parallel sliding bars carrying the forks which shift the gears.

Fig. 3 shows the lock as manufactured ready to be adjusted to position on the gear casing. $d$ is a cylindrical casing which I preferably make of greater diameter above and reduced, as shown at $d^2$, below. $d^3$ indicates a diametral passage extending horizontally through the casing $d$ at its lower end.

$e$ is a rotatable spindle fitting in the casing $d$ coaxially therewith. At the upper end of the rod $e$ there is located a locking device which may be a pin lock or of similar construction. There is a key $x$ (Figs. 4 and 8) which is inserted in a slot in the upper end of the part $e^2$ of the rod, or spindle, $e$ and when so inserted adjusts the locking bars $g$ (Fig. 4) to a position to permit the turning of said spindle. When the key $x$ is withdrawn the bars $g$ engage the casing $d$ and prevent the turning of the spindle $e$.

The lower end of the spindle $e$ is cut away on both sides to form a cam $e^3$ and balls $f\ f$ are inserted in the passage or aperture $d^3$, one at each side of said cam. The walls of the casing at the ends of the aperture $d^3$ are pressed inward, to prevent the balls $f$ from falling out of the passage $d^3$.

When the spindle $e$ is at the position indicated in Fig. 5 the cam $e^3$ permits the balls $f\ f$ to enter fully within the passage $d^3$. When the spindle is turned at right angles and to the position shown in Fig. 6, the balls $f\ f$ are forced outward so that they protrude from said passage.

The method of adjusting the lock to the gear casing is as follows: A circular hole is bored in the cover or upper surface of the gear casing between the rods $c\ c$ and said rods are placed in their neutral position and apertures $c^2$ are formed in said rods opposite each other of a shape and size adapted to receive the balls $f\ f$ when protruded from the aperture $d^3$ in the casing $d$. The casing $d$ is then inserted in the hole bored in the top of the gear casing so that it occupies the space between the rods $c\ c$ with the aperture $d^3$ and the balls therein in line with the aperture $c^2$ in the rod. The casing is of such a size as to just occupy the space between the rods. The casing $d$ being thus inserted through the aperture in the gear casing is then welded to said casing. Now, if a key $x$ is inserted in the key-hole at the top of the spindle $e$ and said spindle is turned thereby to the position indicated in Fig. 6, the balls $f\ f$ will be forced partly out of the passage or aperture $d^3$ and partly into the aperture $c^2$ in the rods $c\ c$, thus locking said rods in their neutral position.

In Figs. 8 and 9 I have shown three balls $f$ with the end of the spindle $e$ milled out to pass over the middle ball. Thus when the spindle $e$ is turned with its milled portion in line with the aperture $d^3$ the balls $f$ will be entirely within said aperture and when the spindle $e$ is turned to the position shown in Figs. 8 and 9 the forks or cams at the lower end will pass between the balls $f\ f$ and force the outer balls into locking position.

It will be observed that this lock may be made complete in itself and readily adjusted to position upon a form of change speed gearing in common use and readily secured in position; that the spindle $e$ is supported at its lower end by the casing so as to securely hold the bars $c$ when the lock engages said bars; that the lock is of simple and strong construction occupying but little space and readily manipulated.

What I claim is:

1. The combination of a change speed gear casing, sliding gear shifting rods in said casing having apertures at their adjacent sides opposite each other in neutral position, a walled cavity extending between said apertures in said position of the rods, a plurality of parts bearing and adapted to reciprocate in said passage, a rotatable rod having its axis extending at right angles to said passage and its inner end extending into said passage, the inner end of said rod being shaped to act as a cam so that the turning of said rod about its axis to one position shall cause said parts to engage in said apertures and turning the rod to another position shall permit said parts to recede from said apertures.

2. The combination of a change speed gear casing, sliding gear shifting rods in said casing having apertures in their adjacent sides opposite each other in neutral position, a locking casing secured to said gear casing between said rods, a rotatable spindle in said locking casing, a locking device adapted to lock said spindle from rotation and release the same, a transverse passage through the lower end of said locking casing, parts adapted to reciprocate in said passage guided and supported by the walls thereof, said spindle being provided with a cam adapted to actuate said parts to cause them to protrude from said passage to engage in the cavities in said shifting rods, said locking casing being of a transverse dimension adjacent to said passage equal to the distance between said shifting rods, substantially as and for the purpose described.

3. The combination of a change speed gear casing, a lock casing secured to said casing, sliding gear-shifting rods in the gear casing, having apertures in their adjacent sides opposite each other in neutral position, said lock casing being secured to the gear casing between the sliding rods, a transverse passage through the lower end of the lock casing in line with the apertures in said rods, said lock casing being of a transverse dimension adjacent to said passage equal to the distance between said rods, a rotatable spindle in said casing, a locking device adapted to lock said spindle from rotation and release the same, said spindle projecting into said transverse aperture and being provided with a cam in said transverse aperture, parts adapted to reciprocate in said aperture and to be actuated by said cam to cause them to protrude from said passage into the apertures in said rods, said reciprocating parts being guided and supported by the walls of said passage.

In testimony whereof, I sign this specification.

CHARLES G. TROSIEN.